(12) United States Patent
Wang

(10) Patent No.: US 7,088,885 B1
(45) Date of Patent: Aug. 8, 2006

(54) SYSTEM FOR MODULATING OPTICAL SIGNALS

(75) Inventor: Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/430,495

(22) Filed: May 5, 2003

Related U.S. Application Data

(60) Provisional application No. 60/426,140, filed on Nov. 13, 2002.

(51) Int. Cl.
- G02B 6/28 (2006.01)
- G02B 6/26 (2006.01)
- H04J 14/02 (2006.01)
- H04B 10/00 (2006.01)

(52) U.S. Cl. .......................... 385/24; 385/15; 398/79; 398/82; 398/88; 398/135

(58) Field of Classification Search ................. 385/1–3, 385/15, 24; 398/128, 135, 182, 183, 79, 398/86–88, 82, 90, 76; 359/237, 618; 439/76.1
See application file for complete search history.

(56) References Cited

U.S. PATENT DOCUMENTS

| | | | |
|---|---|---|---|
| 5,432,632 A * | 7/1995 | Watanabe | ..... 398/76 |
| 5,937,116 A | 8/1999 | Seto | |
| 6,342,960 B1 | 1/2002 | McCullough | |
| 6,370,296 B1 * | 4/2002 | Cao | ..... 385/24 |
| 6,575,770 B1 * | 6/2003 | Birch et al. | ..... 439/76.1 |
| 2004/0018019 A1 * | 1/2004 | Lacey et al. | ..... 398/82 |

\* cited by examiner

*Primary Examiner*—Ricky Mack
*Assistant Examiner*—Jack Dinh
(74) *Attorney, Agent, or Firm*—Workman Nydegger

(57) ABSTRACT

An optical signal production and modulation system that enables a multiplexed optical signal to be created for transmission without the use of more traditional laser-based optical transceivers. The system includes a light source library and a plurality of modulating optical transceivers. The light source library receives a composite wavelength un-modulated light signal, amplifies it, and separates it into discrete signal channels. Each of these channels is sent to a modulating optical transceiver, which employs a combination of lenses, reflective components, and a pin diode to modulate the channel with the desired data to be carried. The modulated channel can then be forwarded for multiplexing and transmission via a communications network.

8 Claims, 6 Drawing Sheets

SYSTEM FOR MODULATING OPTICAL SIGNALS

RELATED APPLICATION

This application claims the benefit of U.S. Provisional Patent Application Ser. No. 60/426,140, filed Nov. 13, 2002, which is incorporated herein by reference.

BACKGROUND OF THE INVENTION

1. The Field of the Invention

The present invention generally relates to optical communications systems. More particularly, the present invention relates to a system of producing and modulating optical signals for transmission via an optical communications network.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks typically employ optical transceivers in transmitting information via the network from a transmission node to a reception node. At the transmission node, typical optical transceivers receive an electrical data signal from a network device, such as a computer, and convert the electrical data signal to a modulated digital optical data signal using a laser. Thus, production of a pulse of light by the laser can correspond to a digital "one" or "zero," while no pulse corresponds to a "zero" or "one," respectively, according to the configuration of the network. The modulated optical data signal produced by the laser can then be transmitted in a fiber optic cable via the optical network, such as a LAN backbone, for instance.

The optical data signal is transmitted to and received by a reception node of the network. Once received by the reception node, the optical data signal is fed to another optical transceiver for conversion into electrical data signals. The electrical data signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

The majority of components included in the optical transceiver are disposed on a printed circuit board ("PCB"). These components include a controller, which governs general operation of the transceiver, a laser driver for controlling operation of the laser in the transmitter portion, and a post-amplifier for controlling the conversion of incoming optical signals into electrical signals in the receiver portion. These components are typically configured as integrated circuits on the PCB.

Despite their utility, traditional laser-based transceivers are confronted by various challenges. Among these is laser chirp, which refers to the drifting of the frequency of the optical signal produced by the transceiver. Laser chirp is temperature dependent: as the laser temperature varies during operation, the frequency drift of the light signal can likewise vary. As it affects the quality of the optical signal produced by the transceiver, laser chirp can represent a significant problem to be overcome during transceiver operation.

To acceptably deal with the above, lasers must be designed to mitigate the effects of laser chirp and related challenges. Unfortunately, this requires that the transceiver be implemented with a variety of devices, including temperature controllers, laser bias controls, wavelength locking components, and other circuitry for adjusting transceiver components as necessary. Not only does this increase the cost of the transceiver in terms of added manufacturing steps, it also increases the complexity of the device. Furthermore, these additional components can sometimes fail to control the laser's operation as would be desired, thereby introducing issues of reliability into transceiver performance.

A need therefore exists for an optical system that can reliably produce modulated optical signals without the attendant problems observed in known systems, as explained above.

BRIEF SUMMARY OF THE INVENTION

Briefly summarized, embodiments of the present invention are directed to an optical signal production and modulation system that enables a multiplexed optical signal to be created for transmission without the use of more traditional laser-based optical transceivers. The system comprises a light source library and a plurality of modulating optical transceivers. The light source library receives a composite wavelength un-modulated light signal, amplifies it, and separates it into discrete signal channels. Each of these channels is sent to a modulating optical transceiver, which employs a combination of lenses, reflective components, and a pin diode to modulate the channel with the desired data to be carried. The modulated channel can then be forwarded for multiplexing and transmission via a communications network.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–6 depict various features of embodiments of the present invention, which is generally directed to an optical signal production and modulation system. The modulating system can be used in lieu of laser-based modulation systems to encode data onto an optical signal for transmission via an optical communications network. Utilization of the present system enables simplification of the transceiver design, thereby reducing the complexity and cost of the transceiver. The structure of the present system also avoids challenges typically encountered in laser-based systems, such as laser chirp, for instance.

Figure 1:
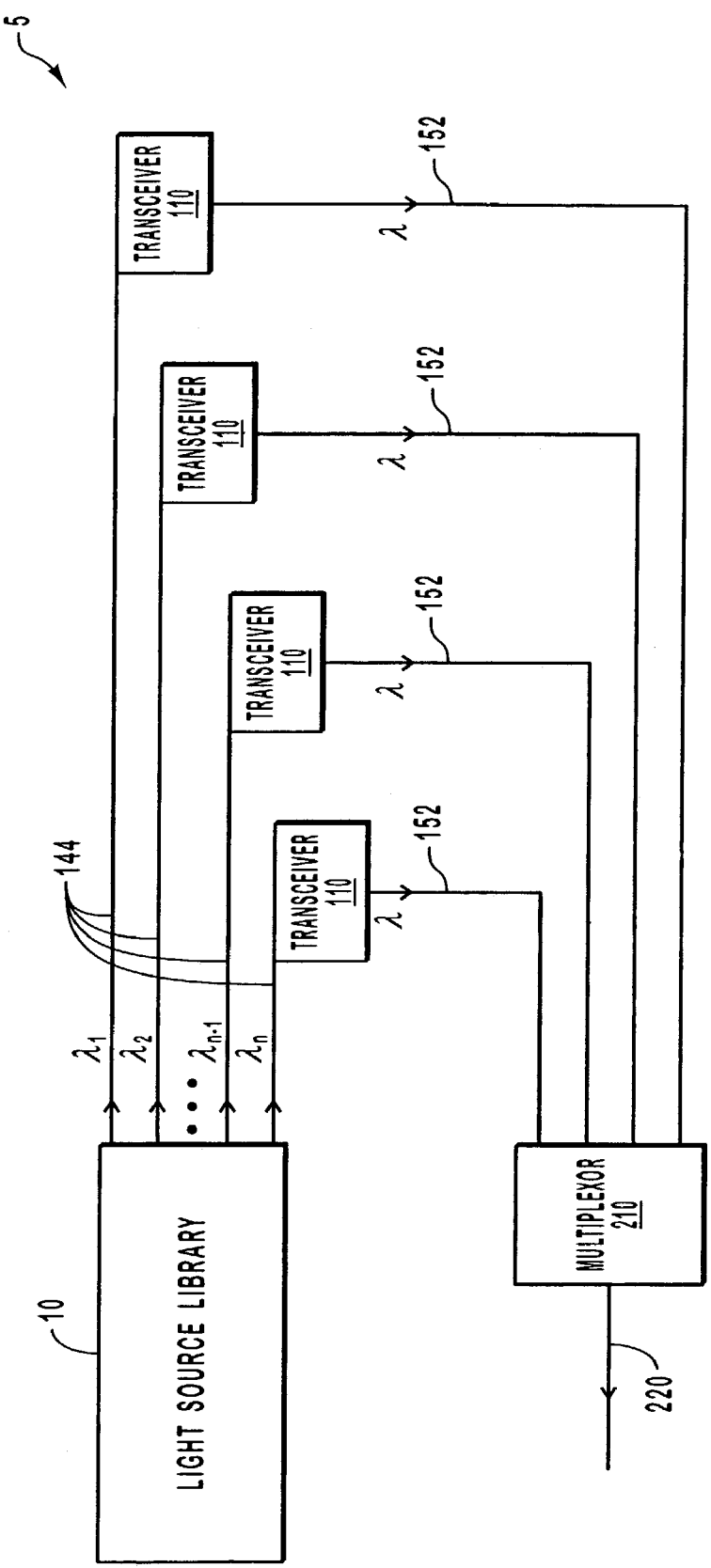
FIG. 1 is a block diagram illustrating various components comprising one embodiment of the present invention.

Reference is first made to FIG. 1, which illustrates various components that comprise the present system for producing and modulating optical signals, which is generally designated at 5. As is depicted, the system 5 generally comprises several components, including a light source library 10, a plurality of modulating optical transceivers 110, and a multiplexor 210. Generally, the system 5 is initially employed to produce a composite, multi-wavelength, unmodulated optical signal that is divided into a number n of wavelength-distinct optical signals, or channels $\lambda$, by the light source library 10. Each channel $\lambda$ is then sent to one of the optical transceivers 110, wherein each transceiver utilizes non-laser-based means to modulate the optical signal into a modulated optical data signal carrying data from a host device (not shown). In other words, the transceivers generally to not have lasers or other internal source of light, and the data is modulated onto the channels without the transceivers using internal sources of light. The channels $\lambda$ are combined by the multiplexor 210 and are transmitted to an optical communications network (not shown) for receipt by a remote device. The present system 5 does not employ laser-based transceivers for producing and modulating optical data signals, and thus does not suffer from the effects of such transceivers. Each of the above components will be described in more detail as follows.

It is noted that, though the present system 5 for producing and modulating optical signals comprises structure and components for both transmitting and receiving optical signals, for purposes of clarity the present discussion and accompanying figures concentrate on only the details relating to optical signal transmission. It is further noted that the four channels $\lambda_1, \lambda_2, \lambda_{n-1},$ and $\lambda_n$ shown in FIG. 1 are merely representative of the possible number n of channels that can be produced by the light source library 10 and transmitted to the plurality of optical transceivers 110. Indeed, it is appreciated that the number n of channels $\lambda$ that can be output by the light source library 10 can be designed with substantial flexibility.

Reference is made to FIG. 1 in describing various details of the light source library 10. The light source library 10 is capable of producing a series of discrete optical signal channels $\lambda$, wherein each channel possesses a distinct wavelength. As will be seen, these channels $\lambda$ are used by the transceivers 110 to modulate electrical data onto each optical signal channel for transmission via an optical communications network. In one embodiment, each of the channels $\lambda$, once modulated by one of the transceivers 110, is combined with the other modulated channels using course wavelength division multiplexing ("CWDM") or dense wavelength division multiplexing ("DWDM") techniques in order to maximize the amount of data transmission via the optical network.

FIG. 1 depicts a light source library, generally designated at 10. As can be seen, the light source library 10 generally comprises several components, including an optical signal generator 12, an interleaver 14, and a channel separator 16. The light source library 10 further includes a housing 10A that encloses the afore-mentioned components. As discussed, these components cooperate to provide a series of discrete, wavelength-distinct optical signal channels in a manner to be described below. In addition to these, other components can also be disposed within the light source library 10 as may be needed to suit a particular application.

In one embodiment, the optical signal generator 12 comprises an erbium doped fiber amplifier. As such, the amplifier is responsible for receiving an optical signal from a light source and generating an amplified multi-wavelength optical signal to be used by the other components disposed within the light source library 10. The operation of erbium doped fiber amplifiers is well known and will not be discussed in detail here. In some embodiments, additional components can be utilized in connection with the erbium amplifier to produce the amplified multi-wavelength optical signal. A mirror 20 can also be disposed proximate a terminal end of the erbium doped fiber amplifier to reflect light back toward the amplifier as needed.

The amplified light produced by the erbium doped fiber amplifier serving as the optical signal generator 12 is a multi-wavelength optical signal, comprising a combined plurality of distinct wavelength channels $\lambda$. For instance, the erbium amplifier can produce an amplified composite optical signal in the 1,550 nm optical wavelength region, having discrete wavelength channels $\lambda$ that span a range from about 1,530 to 1,562 nm, for example. This corresponds to a wavelength range known as the C-band. Of course, production by the optical signal generator 12 of optical signals comprising distinct wavelength ranges from the above, such as the L-band for instance, are also possible. The amplified optical signal produced by the optical signal generator 12 using an erbium doped fiber amplifier as explained above can possess an intensity of 20 dBm. In an 80-channel system, this yields an intensity per channel in excess of 0 dBm, which represents a greater intensity than that produced by a laser in a typical optical transceiver.

As already mentioned, the composite optical signal produced by the optical signal generator 12 as described above comprises a plurality of discrete optical signal channels $\lambda$. Each channel $\lambda$ is characterized by a specified wavelength that is distinct from the other channels in the composite optical signal. A specified number n of wavelength-distinct channels $\lambda$ is produced by the optical signal generator 12. The number n of channels $\lambda$ that are produced can vary greatly according to the particular characteristics of the communications network 10, but in one embodiment n=40, meaning that 40 channels $\lambda$ are produced by the optical signal generator 12 for use by the other components of the light source library 10. Thus, each channel $\lambda$ can be exactly identified according to its "n number," as in $\lambda_n$. For example, the first optical channel (n=1) can be designated $\lambda_1$, while the last channel (n=40) is designated $\lambda_{40}$. Each channel $\lambda$ can be further categorized as either odd or even, as determined by whether its n number is an odd or even integer. For instance, the ninth channel, $\lambda_9$, is categorized as an odd channel, while $\lambda_{34}$ is an even channel.

The composite optical signal produced by the optical signal generator 12 is forwarded to the interleaver 14. The interleaver 14 is configured to receive the composite optical signal and divide it into two sub-bands comprising the even numbered channels λ and the odd-numbered channels of the composite signal. This results in a sub-band of even numbered channels λ having increased spacing between adjacent channels owing to the absence of the odd numbered channels. Similarly, a sub-band of odd numbered channels λ is created having double the previous spacing between adjacent channels owing to the absence of the even numbered channels.

Figure 2:
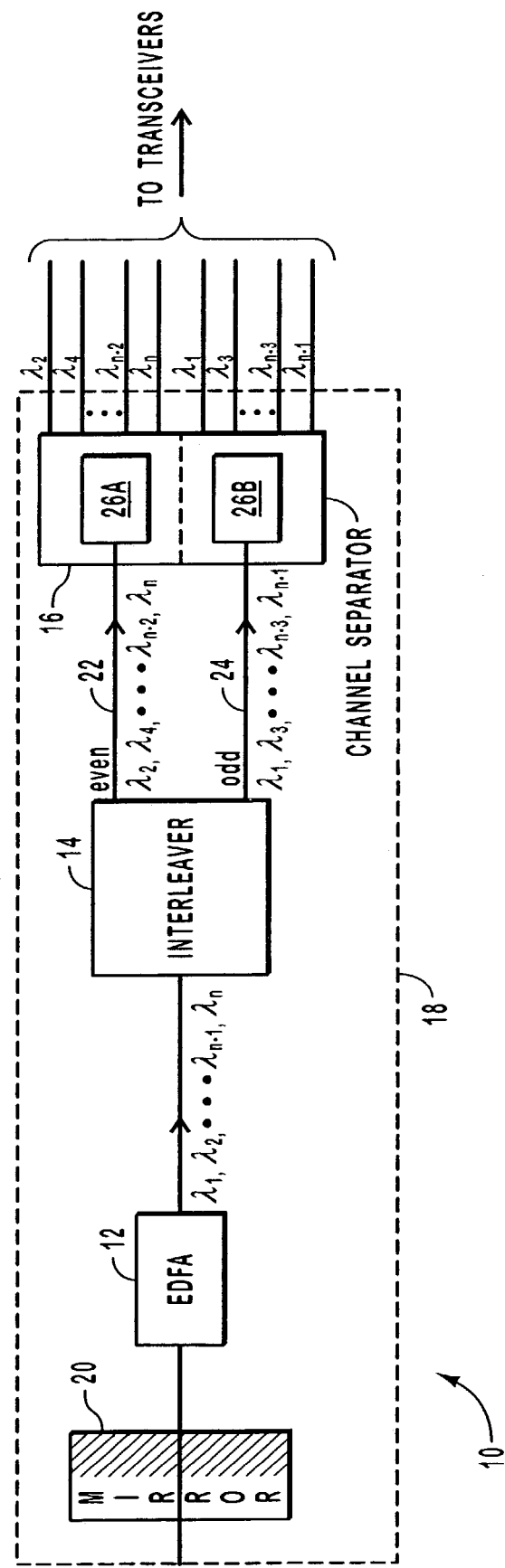
FIG. 2 is a block diagram illustrating various details regarding the light source library of FIG. 1.

Once divided into sub-bands, the even and odd-numbered channels λ are output to two signal lines 22 and 24, respectively. FIG. 2 shows the sub-band of even numbered channels λ (assuming n=40, for instance, such that $\lambda_{n-2}$ and $\lambda_n$ are even) transmitted along the even channel signal line 22, while the sub-band of odd numbered channels λ is shown transmitted along the odd channel signal line 24. The interface existing between each signal line 22 and 24 and the interleaver 14 can be coated so as to increase light transmission therebetween.

Preferably, the interleaver 14 comprises a passive optical device having an all-glass or similarly suitable composition. Further, the interleaver should be substantially a thermal, preferably exhibiting channel peak shifting of only about 2 Ghz in changing temperature conditions. Examples of components that possess these qualities and that can serve as the interleaver 14 are found in U.S. Patent Application Publication No. US 2002/0154845 A1 entitled "Method and Apparatus for an Optical Filter," filed Jun. 11, 2002, published Oct. 24, 2002; and U.S. Patent Application Publication No. US 2002/0154850 A1 entitled "Method and Apparatus for an Optical Filter," filed Aug. 31, 2001, published Oct. 24, 2002, which are both incorporated herein by reference in their entireties.

FIG. 2 further illustrates that both the even channel signal line 22 and the odd channel signal line 24 are connected to the channel separator 16. The channel separator 16 is utilized to receive the sub-band of even numbered channels λ and the sub-band of odd numbered channels and to separate each into its constituent discrete channels. To do this, one or more separating components 26 are included in the channel separator 16. In the illustrated embodiment, two separating components 26A and 26B are disposed in the channel separator 16, one for each sub-band of channels λ relayed from the interleaver 14. In this way, it can be seen that each separating component 26 can be configured so as to separate a specified range of optical signals. Thus, in the present example, the separating component 26A governs the separation of the sub-band of even numbered channels λ into the plurality of wavelength-distinct channels $\lambda_2$, $\lambda_4$, etc., up to and including even channel $\lambda_n$ (in this case, channel 40). Correspondingly, the separating component 26B separates the band of odd numbered channels λ into the plurality of wavelength-distinct channels $\lambda_1$, $\lambda_2$, etc., up to and including odd channel $\lambda_{n-1}$ (in this case, channel 39).

Each separating component 26A and 26B can comprise one of several components designed to separate a composite optical signal. In one embodiment, one or both separating components 26A and 26B can comprise an array wave guide for splitting the even or odd numbered band of channels λ. In another embodiment, one or both separating components 26A and 26B can comprise a grating. Other apparatus for accomplishing composite signal splitting are also contemplated. Note here that the number of separating components comprising the channel separator 16 is not limited to that depicted in FIG. 2. One, two, or more separating components can be used as may be desired for a particular application. Additionally, the interleaver 14 can be configured so as to divide the composite optical signal into more than two bands of channels λ, if desired. Further, more than one interleaver 14 can be employed in connection with the present invention to accomplish the composite signal splitting as discussed here.

Each separating component 26A and 26B outputs each discrete channel λ from the channel separator 16. Each of these channels λ can then be directed from the light source library 10 to one of the plurality of optical transceivers 110 of the system 5. As will be seen below, each discrete channel λ is received by the respective transceiver 110 and modulated with data to form an optical data signal that is forwarded for multiplexing and transmission via an optical communications network.

Further details regarding the present light source library may be found in U.S. patent application Ser. No. 10/430,975, entitled "Light Source Library for Arranging Optical Signals," which is filed simultaneously herewith, and which is incorporated herein by reference in its entirety.

Figure 3:
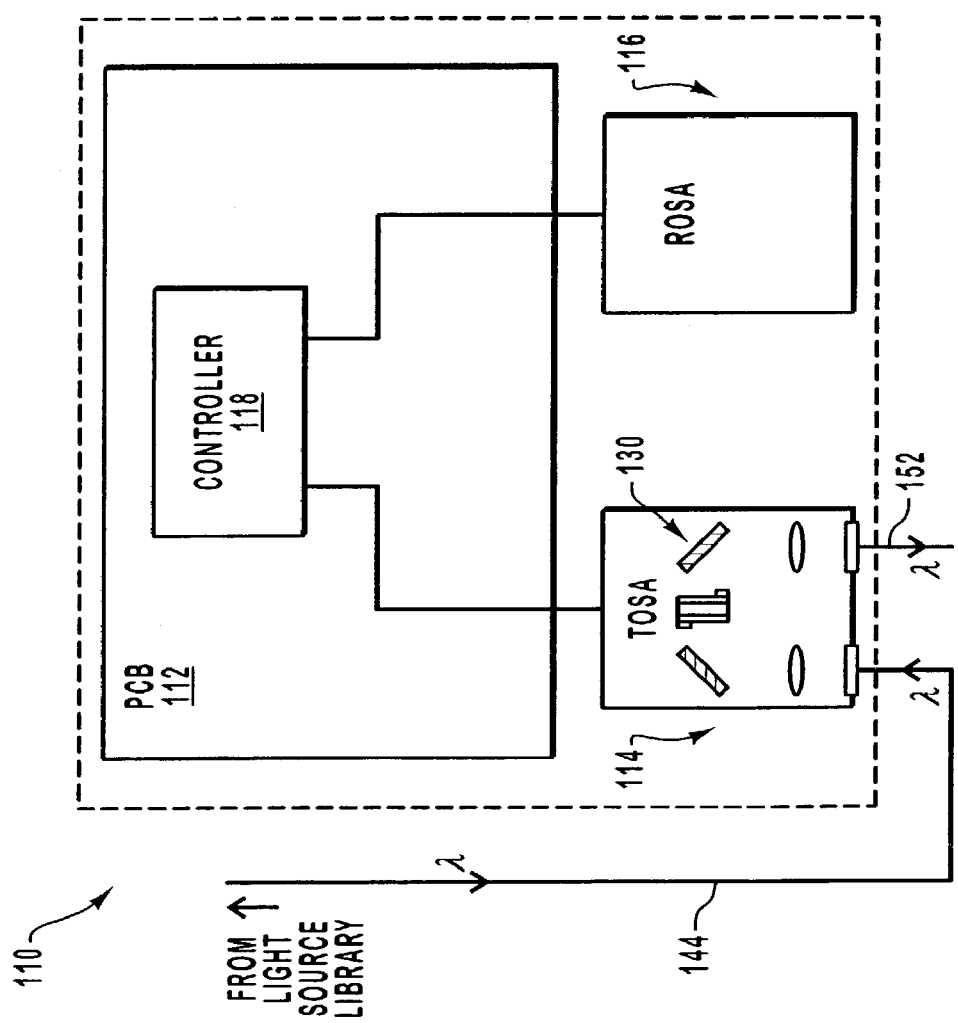
FIG. 3 is a block diagram depicting various details regarding the optical transceiver of FIG. 1.

Reference is now made to FIG. 3, which depicts various components comprising each optical transceiver 110 of the present system 5. As suggested, each transceiver 110 is configured to receive an optical signal channel λ from the light source library 10 to be modulated with data from an electrical data signal provided by a host device (not shown). Further details regarding these functions will be given below.

Each transceiver 110 generally includes a printed circuit board ("PCB") 112, a transmitter optical subassembly ("TOSA") 114, and a receiver optical subassembly ("ROSA") 116. Both the TOSA 114 and the ROSA 116 are connected to a controller 118 that enables the transceiver 110 both to transmit and to receive optical signals that travel via an optical communications network (not shown). As will be explained, the controller 118 is responsible (along with other possible components not explicitly shown) for governing the operation of the TOSA 114, and the ROSA 116. It is appreciated that the controller 118 of the optical transceiver 110 depicted in FIG. 1 can control additional components not explicitly mentioned here that cooperate to provide the functionality of the transceiver.

The ROSA 116 is utilized in the present transceiver 110 to receive incoming optical data signals from the communications network and convert them into electrical data signals that can be used by a host device (not shown) connected to the transceiver. Correspondingly, the TOSA 114 is utilized to convert electrical data signals from the host device into optical data signals for transmission via the communications network. In accordance with embodiments of the present invention, the TOSA 114 converts the electrical data signals without the use of a laser, as in typical transceivers. Rather, the TOSA 114 of each transceiver 110 of the present system 5 is configured to directly modulate the data contained in an electrical data signal onto one of the number n of unmodulated optical signal channels λ provided by the light source library 10 discussed above. The discrete wavelength channel λ is modulated by the TOSA 114 to provide a modulated optical data channel that can then be transmitted by the transceiver 110 to the multiplexor 210 to be combined with other modulated channels from the other transceivers into a multiplexed optical signal. The multiplexed optical signal can then be transmitted via a communications network for receipt by a remote host device (not shown). Further details concerning the operation of both the TOSA 114 and the transceiver 110 are given further below. The present discussion, though describing the structure and operation of a single optical transceiver, applies to each of the transceivers 110 described herein and depicted in the accompanying drawings.

Figure 4:
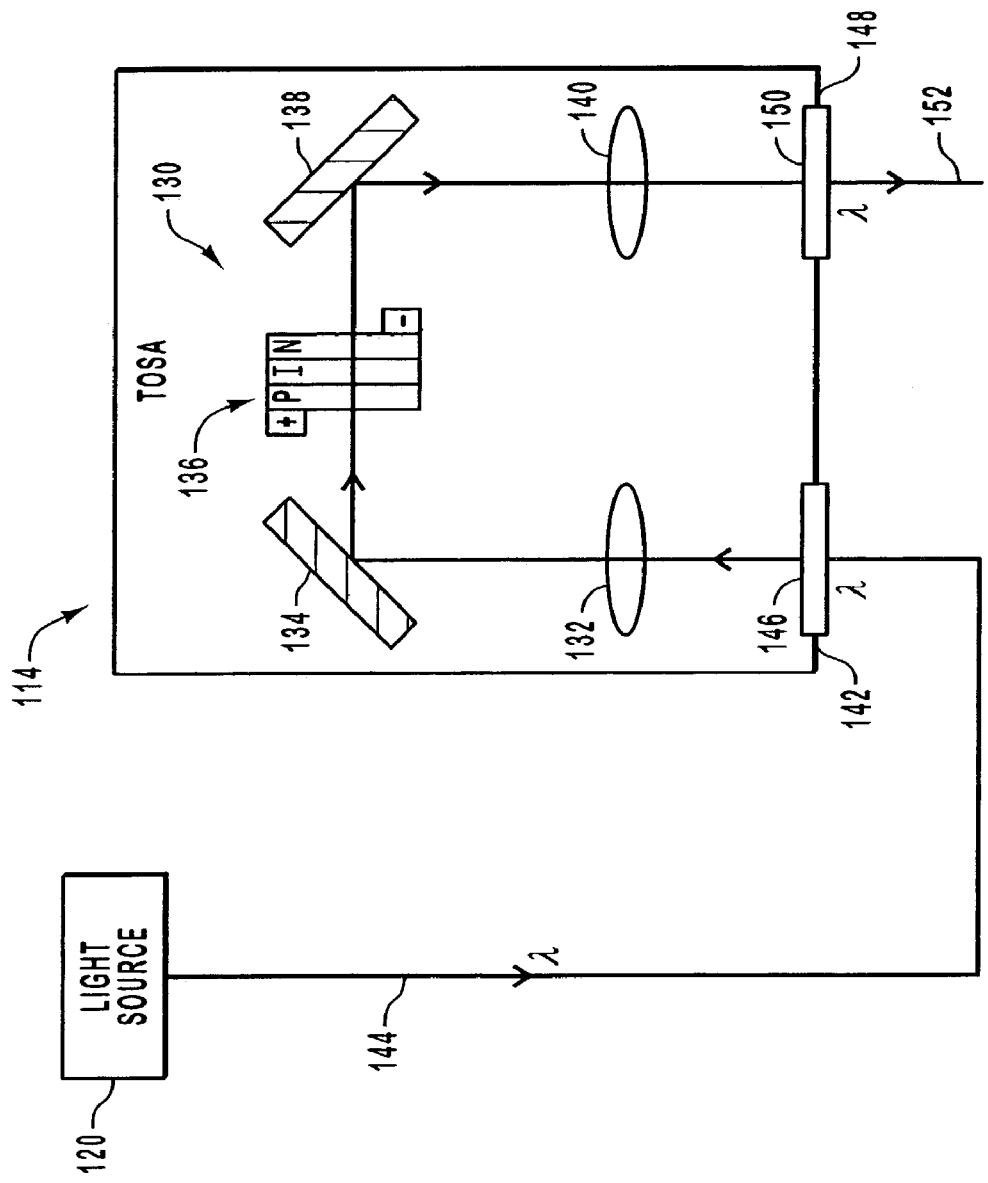
FIG. 4 is a schematic view of several of the components of the transmitter portion of the optical transceiver of FIG. 3, including a p-i-n diode.

Reference is now made to FIG. 4 in describing various details concerning the TOSA 114 of each optical transceiver 110. As can be seen, the TOSA 114 includes a modulating assembly 130 generally comprising a first collimator 132, a first mirror 134, a modulator 136, a second mirror 138, and a second collimator 140. The modulating assembly 130 as will be described is utilized to provide a modulated optical data channel for use in an optical communications network. Details concerning the structure and operation of each of these components is described below.

A wavelength-distinct, un-modulated optical channel λ produced by the light source library 10 is introduced into the TOSA 114 via an inlet 142. In one embodiment, the un-modulated channel λ is transmitted to the TOSA 114 via a fiber optic cable 144 connecting the light source library 10 to the TOSA. A first connector 146, such as an LC connector, mates the fiber optic cable 144 to the TOSA 114 at the inlet 142.

The first collimator 132 is arranged within the TOSA 114 to collimate the un-modulated channel λ received by the TOSA 114 via the inlet 142. Any suitable type of collimating apparatus can be employed here, but in one embodiment the first collimator 132 comprises a collimating lens. As a result of passing through the first collimator, the un-modulated channel λ is shaped and focused as needed before proceeding on through the modulating assembly 130.

After passing through the first collimator 132, the un-modulated channel λ is directed to a first mirror 134, which redirects the signal toward the modulator 136. In the illustrated embodiment, the first mirror 134 is used to redirect the un-modulated channel at an angle of approximately 45 degrees. This configuration minimizes the space needed for the components of the modulating assembly 130.

As a result of its interaction with the first mirror 134, the un-modulated channel λ is directed to and incident upon the modulator 136. As will be explained, the modulator 136 is utilized to modulate digital data onto the channel λ, converting it from an un-modulated optical signal channel to a modulated optical signal channel suitable for transmission via an optical communications network. Generally speaking, the modulator 136 can be selectively cycled between a powered state and an un-powered state in rapid succession so as to selectively enable the channel λ to either pass through the modulator or be absorbed thereby. This selective transmission of the channel λ through the modulator 136 creates a series of light pulses representing either a digital "one" or "zero," depending on the configuration of the signal, which correspond to the data carried by electrical data signal. This in turn transforms the un-modulated channel λ, previously comprising a continuous stream of light waves, into a modulated, data-carrying channel λ, comprising a series of light pulses and light voids, which is now suitable for transmission via an optical communications network. Further details concerning this process are found further below.

After being modulated by the modulator 136, the channel λ is directed to the second mirror 138, which redirects the channel at a 45-degree angle toward the second collimator 140. The second collimator 140, comprising in the illustrated embodiment a collimating lens, focuses and shapes the modulated channel λ as needed before it exits the TOSA 114 via an outlet 148. A second connector 150 disposed at the outlet 148 enables the TOSA 114 to mate to a fiber optic cable 152. Each fiber optic cable 152 of each transceiver 110 then connects with the mulitplexor 210 so as to enable the modulated channels that are transmitted via the cable to be combined into a multiplexed optical signal according to CWDM, DWDM, or similar techniques.

Figure 5B:
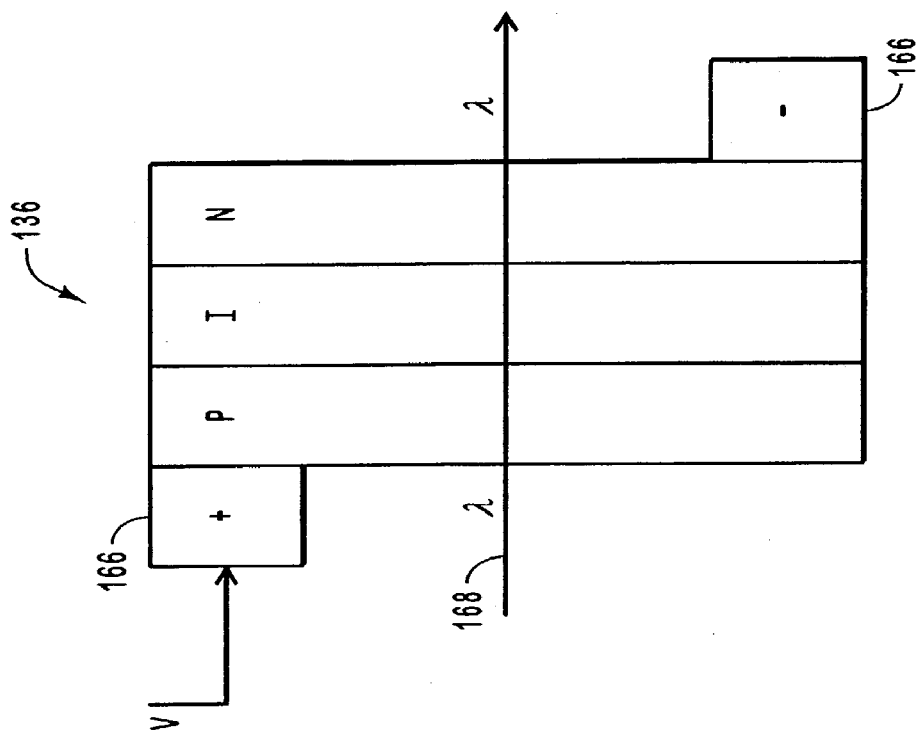
FIG. 5B shows the p-i-n diode of FIG. 4 in a second, transmissive state.
Figure 5A:
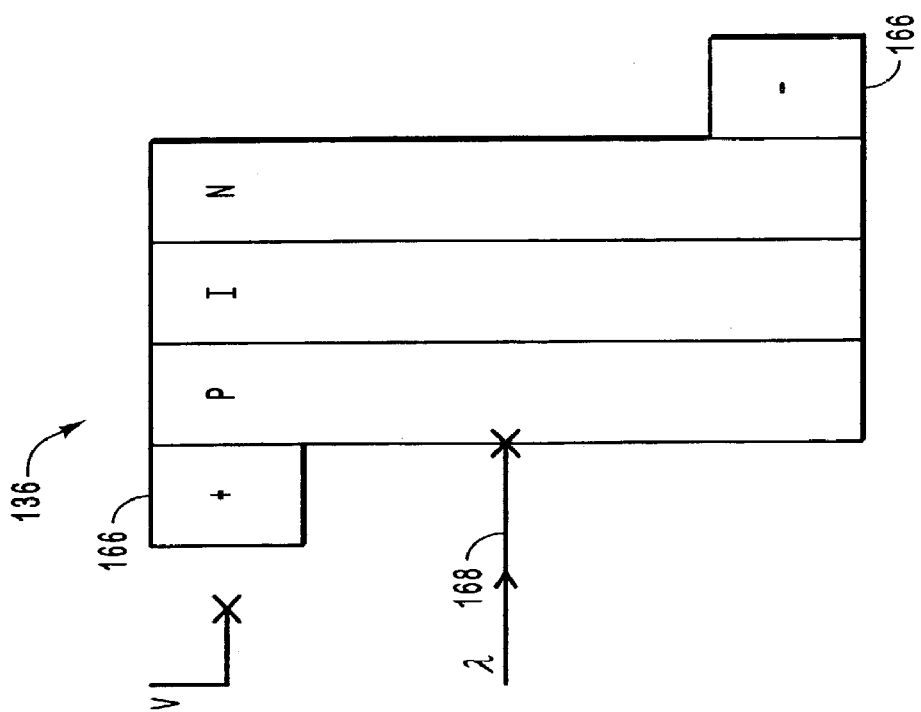
FIG. 5A shows the p-i-n diode of FIG. 4 in a first, absorptive state.

Reference is now made to FIGS. 5A and 5B in describing various details regarding the structure and operation of the modulator 136. In presently preferred embodiments, the modulator 136 comprises a semiconductor-based p-i-n diode having an intrinsic semiconductor 162 interposed between a p-type semiconductor 160 and an n-type semiconductor 164. The intrinsic semiconductor 162 in one embodiment comprises an indium-gallium-arsenide-phosphorus ("InGaAsP") composition. Other compositions for both the intrinsic semiconductor, as well as for the p- and n-type semiconductors 160 and 164, however, are also possible. Electrical contacts 166 are connected to the p-i-n diode to enable an electrical supply voltage V to be applied to the diode during transceiver operation.

In light of the above disclosure, it is appreciated that the modulator 136 can comprise other configurations with substantially the same functionality as will be described while still residing within the scope of the present invention. Moreover, one skilled in the art will also appreciate that the modulating assembly 130 can include different or additional components while still performing the functionality as discussed herein. Thus, these and other modifications to the present teachings are contemplated as comprising part of the invention.

FIG. 5A shows the above-described p-i-n diode, which comprises the modulator 136, in an absorptive first state encountered during operation of the optical transceiver 110. As can be seen, the supply voltage V is not being supplied to the p-i-n diode in FIG. 5A. This causes the p-i-n diode to absorb any optical signal channel λ incident upon it. An un-modulated channel λ, indicated at 168, that is directed to the p-i-n diode from the first mirror 134 (see FIG. 4), then, is absorbed by the p-i-n diode in this absorptive state and is prevented from passing through the diode to the second mirror 138.

In contrast, FIG. 5B shows the p-i-n diode in a transmissive second state encountered during operation of the optical transceiver 110. Here, the supply voltage V is supplied to the p-i-n diode, which causes it to transmit incident optical signal channels λ, such as the un-modulated optical signal channel λ shown at 168, that is received from the first mirror 134 (see FIG. 4). In this transparent state, then, the un-modulated channel λ is allowed to pass through the p-i-n diode and proceed to the second mirror 138, as already discussed.

The absorptive and transmissive states of the p-i-n diode described above in connection with FIGS. 5A and 5B enable the modulating assembly 130 to modulate a data signal onto the un-modulated channel λ. A digital electrical data signal received from a host device connected to the optical transceiver 110 can be relayed to the modulator 136 (composed of the p-i-n diode) by the controller 118 or other appropriate device. The p-i-n diode is then selectively energized and de-energized in rapid succession by the supply voltage V as needed, in coordination with the electrical data signal. This causes the p-i-n diode to correspondingly oscillate between its absorptive and transmissive states according to the electrical data signal and the supply voltage. This in turn causes the un-modulated channel λ incident on the p-i-n diode to either be absorbed by or transmitted through the p-i-n diode, thereby creating a pulsed light data stream, or modulated optical data signal, that corresponds to the electrical data signal, wherein the light pulses represent digital "ones" or "zeroes" of the electrical data. This modulation process occurs at the high speeds that are typical of optical communications networks such that data transmission via the present optical transceiver is not hindered.

Figure 6:
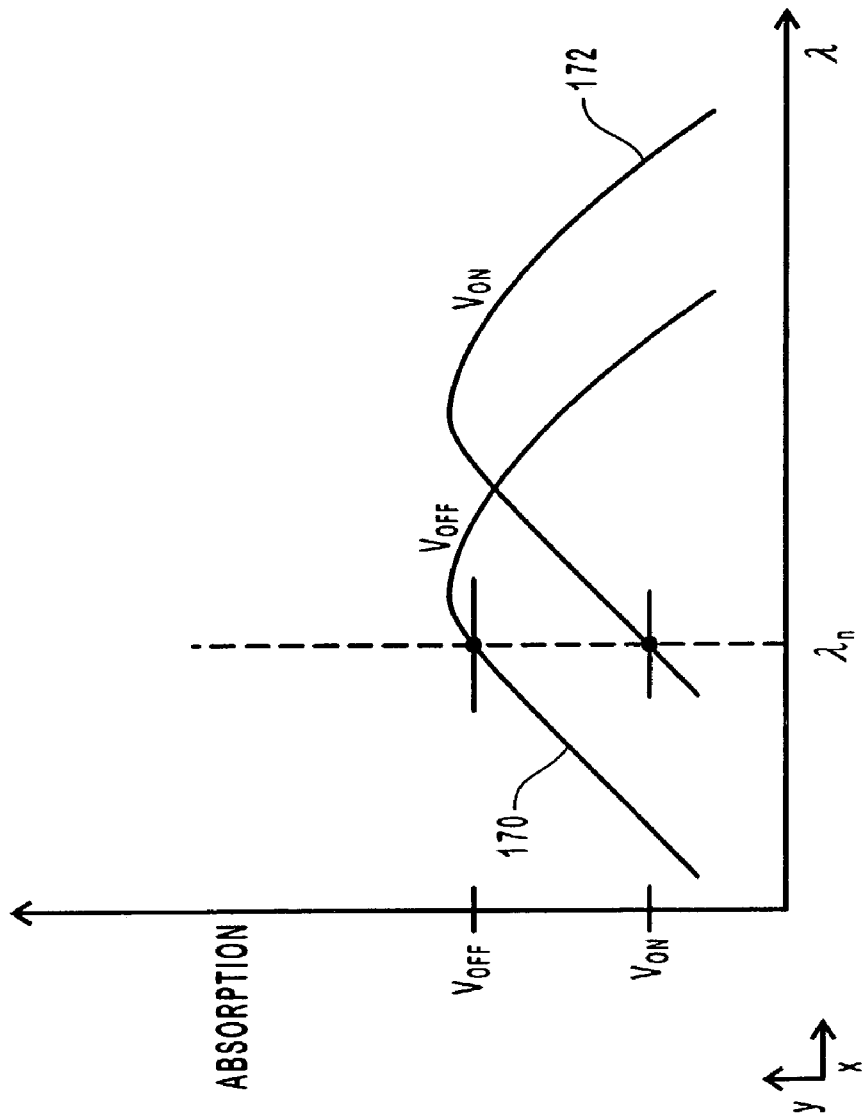
FIG. 6 is a graph showing the absorption spectra for the two operational states of the p-i-n diode of FIG. 4.
Figure 5B:
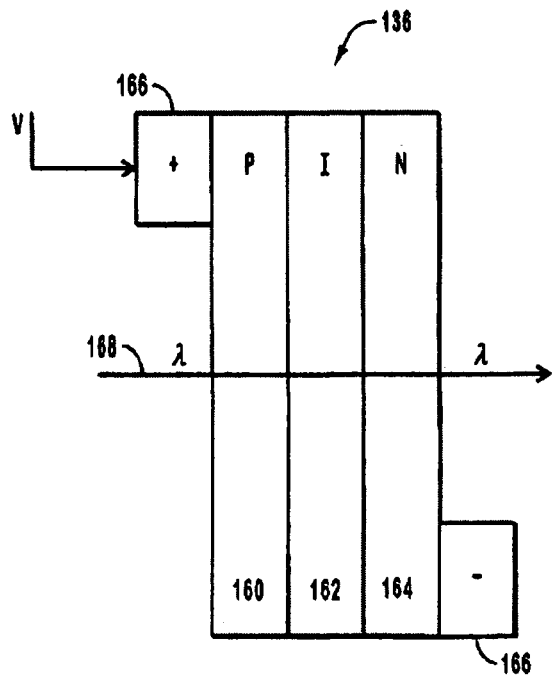

Reference is now made to FIG. 6, which shows a chart depicting absorption spectra for both the absorptive and transmissive states of the p-i-n diode that comprises the modulator 136 as described above. A first curve 170 shows the absorption spectrum for a range of wavelengths, which are positioned along the x-axis when the modulator 136 is in the absorptive state. The range of wavelengths includes $\lambda_n$, which represents the specific wavelength of the channel provided by the light source library 10 to the TOSA 114 of one optical transceiver 110. Similarly, a second curve 172 depicts the absorption spectrum for the same range of wavelengths, including $\lambda_y$, when the modulator 136 is energized by the supply voltage V, making the p-i-n diode transmissive to light signals. The y-axis depicted in FIG. 6 represents the amount of optical signal absorption by the modulator p-i-n diode in both the absorptive and transmissive states. The absorption spectra depicted in FIG. 6 show that the amount of light absorption by the p-i-n diode when the supply voltage V is off is significantly higher than the absorption that occurs when the supply voltage is on. Thus, as already described in connection with FIGS. 5A and 5B, an incident optical signal channel $\lambda_n$ when the supply voltage V is off is substantially absorbed by the p-i-n diode. In contrast, an optical signal channel $\lambda_n$ incident on the p-i-n diode when the supply voltage V is on is substantially transmitted through the p-i-n diode and continues unhindered through the remaining portion of the modulating assembly 130. In this way, the un-modulated optical signal channel $\lambda_n$ is modulated into a series of light pulses and voids as already discussed.

FIG. 6 further suggests that the structure and/or composition of the p-i-n diode can be modified as desired so as to provide an appropriate absorption profile for an optical light channel 4 having a specified wavelength. For example, the absorption spectra produced by the p-i-n diode can be modified by growing a lattice structure in the intrinsic semiconductor layer of the diode. Because of this, a single type of p-i-n diode can be used in various optical transceivers to modulate optical signal channels $\lambda$ having a range of distinct wavelengths. For instance, in one embodiment a p-i-n diode of a particular configuration can be used to modulate optical signal channels $\lambda$ having a wavelength existing anywhere within a range of approximately 40 nanometers. In this way, optical transceivers including p-i-n diodes having one of only four different configurations could be used in the present system 5 to modulate optical signals throughout the entire C-band, if desired. This provides added efficiency and simplicity to such systems.

Further details regarding the optical transceiver may be found in U.S. Patent application Ser. No. 10/430,465, entitled "Optical Transceiver Having a Modulating Component," which is filed simultaneously herewith, and which is incorporated herein by reference in its entirety.

As mentioned, after being modulating with data at its respective optical transceiver 110, each modulated channel $\lambda$ is forwarded via the fiber optic cable 152 to the multiplexor 210, seen in FIG. 1. The mulitplexor 210 combines all the modulated channels $\lambda$ to form a multiplexed optical signal according to CWDM, DWDM, or similar techniques. This multiplexed optical signal is then forwarded via signal line 220 to an optical communications network (not shown) for transmission thereon.

It is appreciated that the components described above can be disposed in a variety of physical configurations. In one embodiment, each optical transceiver 110 is disposed within a rack box containing additional components and circuitry as needed for proper operation of the transceiver. A plurality of these rack boxes can be positioned in a rack, as can both the light source library 10 and the multiplexor 210 as well. One skilled in the art will further understand that the multiplexor can comprise one of several implementations, including a dual multiplexor/demultiplexor.

The present optical transceiver provides an alternative option for producing a modulated optical signal channel for use in optical communications networks and the like. Moreover, the modulating assembly negates various challenges that are common with laser-based transceivers, such as laser chirp. This in turn, eliminates the need for laser temperature controls, laser bias controls, wavelength locking components, and other control components associated with lasers, thereby simplifying transceiver design and reducing the costs of manufacture. In addition, p-i-n diodes are relatively easier to manufacture and produce than are traditional lasers disposed in known optical transceivers.

Another advantage derived from the present optical transceiver involves the coupling of a fiber optic cable to the optical transceiver. The end of a fiber optic cable typically possesses a relatively small cross sectional optical transmission area, typically in the range of 7 microns in diameter. The cross sectional optical area of a typical laser in known optical transceivers is typically on the order of only 1×2 microns. Thus, alignment of the laser output with the end of the fiber optic cable is difficult and often results in optical coupling efficiency losses of up to 50%. In contrast, the modulating assembly of the present invention can produce a modulated optical signal channel $\lambda$ having a cross sectional diameter of 50 or even 100 microns. This enables the optical output of the modulating assembly to be easily coupled with the end of the fiber optic cable, resulting in a substantially greater coupling efficiency at the TOSA/cable interface.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In an optical signal generation system, a method of modulating data on channels of an optical signal, comprising:

using an optical signal generator, producing a composite, multi-channel optical signal, each channel comprising a distinct wavelength;

dividing the multiple wavelength optical signal into a band of even numbered channels and a band of odd numbered channels; and further dividing the bands of even numbered channels and odd numbered channels into discrete channels; and at each of a plurality of optical transceivers, receiving a specified one of the discrete channels and modulating data onto the specified one of the discrete channels, wherein each optical transceiver modulates the specified one of the discrete channels by selectively passing or absorbing the specified one of the discrete channels.

2. The method of claim 1, wherein dividing the multiple wavelength optical signal is performed using a passive optical device.

3. The method of claim 1, wherein the discrete channels are selected so as to be compatible with a coarse wavelength division multiplexing signal.

4. The method of claim 1, wherein the discrete channels are selected so as to be compatible with a dense wavelength division multiplexing signal.

5. The method of claim 1, wherein the specified one of the discrete channels is received at each of the plurality of optical transceivers and data is modulated thereonto without the plurality of optical transceivers having an internal source of light.

6. An optical signal generation system, comprising:
   a multiple wavelength light source, including:
      an optical signal generator capable of producing a composite, multi-channel optical signal, each channel comprising a distinct wavelength;
      an interleaving component for dividing the multiple wavelength optical signal into a band of even numbered channels and a band of odd numbered channels; and
      a channel separator configured to further divide the bands of even numbered channels and odd numbered channels produced by the interleaving component into discrete channels; and
   a plurality of optical transceivers, wherein each optical transceiver is configured to receive a specified one of the discrete channels produced by the light source and to modulate a data onto the specified one of the discrete channels by selectively passing or absorbing the specified one of the discrete channels.

7. The optical signal generation system as recited in claim 6, wherein each optical transceiver comprises:
   a printed circuit board;
   a controller disposed on the printed circuit board;
   a receiver optical sub-assembly connected to the controller; and
   a transmitter optical sub-assembly that modulates the data onto the specified one of the discrete channels.

8. The optical signal generation system as recited in claim 6, wherein each of the plurality of optical transceivers comprises a transmitter optical sub-assembly that includes:
   a first lens for collimating the discrete channel that is input into the transmitter optical sub-assembly from the light source;
   a modulator switchable between an optically absorptive state and an optically transmissive state, comprising:
      a p-type semiconductor;
      an n-type semiconductor; and
      an intrinsic semiconductor interposed between the p-type and n-type semiconductors;
   a first mirror positioned to direct the discrete channel received from the first collimating lens toward the modulator such that the discrete channel is incident upon the modulator, wherein a portion of the discrete channel is absorbed by the modulator when the modulator is in the optically absorptive state, and wherein a portion of the optical signal is allowed to pass through the modulator when the modulator is in the optically transmissive state, thereby producing a modulated channel;
   a second mirror positioned to re-direct the modulated channel that is transmitted by the modulator; and
   a second lens for collimating the modulated channel that is re-directed by the second mirror before the modulated channel exits the transmitter optical sub-assembly.

* * * * *

UNITED STATES PATENT AND TRADEMARK OFFICE
CERTIFICATE OF CORRECTION

Page 1 of 2

PATENT NO. : 7,088,885 B1
APPLICATION NO. : 10/430495
DATED : August 8, 2006
INVENTOR(S) : Wang It is certified that error appears in the above-identified patent and that said Letters Patent is hereby corrected as shown below:

Drawings
Sheet 5, replace FIG. 5A with the figure depicted herein below, wherein the references --160--, --162--, and --164-- have been added.

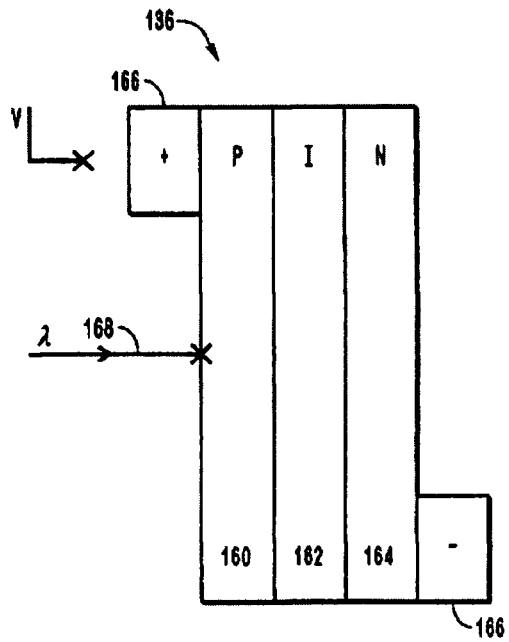

FIG. 5A

Signed and Sealed this
Fourteenth Day of August, 2012

David J. Kappos
*Director of the United States Patent and Trademark Office*

Sheet 5, replace FIG. 5B with the figure depicted herein below, wherein the references --160--, --162--, and --164-- have been added.

Column 3
Line 36, change "to" to --do--

Column 4
Line 6, change "FIG. 1" to --FIG. 2--
Line 10, remove [10A]

Column 9
Line 42, change "4" to --$\lambda_n$--